US011568578B2

(12) United States Patent
Lin et al.

(10) Patent No.: US 11,568,578 B2
(45) Date of Patent: Jan. 31, 2023

(54) METHOD FOR GENERATING GOODS MODELING DATA AND GOODS MODELING DATA GENERATION DEVICE

(71) Applicant: INDUSTRIAL TECHNOLOGY RESEARCH INSTITUTE, HsinchuT (TW)

(72) Inventors: Chang Hong Lin, Hsinchu County (TW); Po Hsuan Hsiao, Nantou County (TW); Guan Rong Lin, Hsinchu (TW); Yu-Chi Lu, Taoyuan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 282 days.

(21) Appl. No.: 17/134,820

(22) Filed: Dec. 28, 2020

(65) Prior Publication Data
US 2022/0207784 A1    Jun. 30, 2022

(51) Int. Cl.
*G06F 3/01* (2006.01)
*G06T 11/00* (2006.01)
(Continued)

(52) U.S. Cl.
CPC ............... *G06T 11/00* (2013.01); *G06T 3/60* (2013.01); *G06T 7/194* (2017.01); *G06V 20/00* (2022.01); *H04N 5/2253* (2013.01); *H04N 5/247* (2013.01)

(58) Field of Classification Search
CPC ....... G01S 13/867; G05D 1/106; G06T 15/04; G06T 7/246; G06T 11/00; G06T 3/60;
(Continued)

(56) References Cited

U.S. PATENT DOCUMENTS 10,482,616 B2*  11/2019  Chang ................... G06T 17/00
2002/0033819 A1*   3/2002  Bewley, Jr. ............ G01B 11/25
                                                       345/419
(Continued)

FOREIGN PATENT DOCUMENTS

CN    103218849 A    7/2013
CN    109711472      5/2019
(Continued)

OTHER PUBLICATIONS

Ren e t al., "Faster R-CNN: Towards Real-Time Object Detection with Region Proposal Networks": Jan. 2016.
(Continued)

*Primary Examiner* — Phuoc H Doan
(74) *Attorney, Agent, or Firm* — Maschoff Brennan

(57) ABSTRACT

A method for generating goods modeling data comprises obtaining a platform image associated with a platform, a plurality of first goods images and a plurality of second goods images, wherein the first goods images and the second goods images correspond to different viewing angles respectively, and an image synthesis processing is performed according to the platform image and at least one of the first goods images and the second goods images to generate a synthesized image. The synthesized image includes a plurality of adjacent or partially overlapping image areas which correspond to at least many of the viewing angles. The image areas include a first and a second image areas. The first image area includes one of the first goods images or one of the second goods images. The second image area includes one of the first goods images or one of the second goods images.

19 Claims, 11 Drawing Sheets

(51) Int. Cl.
  *G06T 3/60* (2006.01)
  *H04N 5/247* (2006.01)
  *G06T 7/194* (2017.01)
  *H04N 5/225* (2006.01)
  *G06V 20/00* (2022.01)

(58) Field of Classification Search
  CPC ........... G06T 7/194; G06T 7/60; G02B 21/26; G02B 21/16; G06K 9/209; G06K 9/00624; H04N 5/247; H04N 7/18; H04N 5/23299
  USPC .......................................... 382/103; 345/419
  See application file for complete search history.

(56) References Cited

U.S. PATENT DOCUMENTS

2018/0262750 A1  9/2018  Choi
2020/0193587 A1  6/2020  Mairhofer

FOREIGN PATENT DOCUMENTS

| CN | 110766720 | 2/2020 |
| CN | 111046702 A | 4/2020 |
| CN | 210493544 | 5/2020 |
| TW | 201839722 A | 11/2018 |
| TW | I684925 | 2/2020 |

OTHER PUBLICATIONS

Feng et al., "GVCNN: Group-View Convolutional Neural Networks for 3D Shape Recognition" Jun. 2018.
Brock et al., "Large scale gan training for high fidelity natural image synthesis" Feb. 2019.
Su et al., "Multi-view convolutional neural networks for 3D shape recognition" Sep. 2015.
Park et al., "Semantic image synthesis with spatially-adaptive normalization" Nov. 2019.
Redmon et al., "YoLov3: An incremental improvement" Apr. 2018.
Taiwan Office Action dated Sep. 30, 2021 as received in application No. 110100469.

* cited by examiner

METHOD FOR GENERATING GOODS MODELING DATA AND GOODS MODELING DATA GENERATION DEVICE

BACKGROUND

1. Technical Field

This disclosure relates to a method for generating goods modeling data and a goods modeling data generation device.

2. Related Art

In recent years, many machine learning algorithms have risen. One application is to use the machine learning algorithm to generate a goods model, and to identify goods on shelves through the goods model generated by the machine learning algorithm to realize unmanned stores. In order to generate a goods model with a high recognition rate, training data for the machine learning algorithm should contain sufficient goods features. The arrangement of multiple goods on the shelf may have multiple combinations. The modeling method of goods has become one of the current development trends.

SUMMARY

Accordingly, this disclosure provides a method for generating goods modeling data and a goods modeling data generation device, the synthesized image can be used to simulate actual adjacent or overlapping situations of different goods on the platform, and a goods model generated by the machine learning algorithm according to the synthesized image will have a higher recognition rate.

According to one or more embodiment of this disclosure, a method for generating goods modeling data comprises: obtaining a platform image associated with a platform; obtaining a plurality of first goods images of a first goods placed on the platform, wherein the first goods images respectively correspond to different viewing angles; obtaining a plurality of second goods images of a second goods placed on the platform, wherein the second goods images respectively correspond to the different viewing angles; and performing an image synthesis processing on the platform image and at least one of the first goods images and the second goods images to generate a synthesized image, wherein the synthesized image comprises at least a plurality of adjacent or partially overlapping image areas which corresponds to the different viewing angles, and the image areas comprises a first image area and a second image area, the first image area comprises one of the first goods images or one of the second goods images, and the second image area comprises one of the first goods images or one of the second goods images.

According to one or more embodiment of this disclosure, a goods modeling data generation device comprises a platform for placing a first goods and a second goods, at least one camera, and a management host electrically connected to the at least one camera, wherein the management host is configured to drive the at least one camera to shoot the platform to obtain a platform image, to shoot the first goods to obtain a plurality of first goods images, and to shoot the second goods to obtain a plurality of second goods images, the first goods images respectively correspond to a plurality of different viewing angles, and the second goods images respectively correspond to the different viewing angles, the management host is configured to perform an image synthesis processing to generate a synthesized image according to the platform image and at least one of the first goods images and the second goods images, the synthesized image comprises at least a plurality of adjacent or partially overlapping image areas which corresponds to the different viewing angles, and the image areas comprise a first image area and a second image area, the first image area comprises one of the first goods images or one of the second goods images, and the second image area comprises one of the first goods images or one of the second goods images.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

A machine learning algorithm can be applied to build a goods model, such as an unmanned store. Goods features can be obtained from images of a goods in different viewing angles. For obtaining the images of the goods in the different viewing angles, one way is to use multiple cameras to sequentially shot the goods placed at different positions on a shelf. In addition, in actual situations, there are often multiple goods on the shelf, so if the modeling data is an image data containing multiple goods which overlap or are adjacent to each other, the goods model with a higher recognition rate may be generated. For obtaining the image data of multiple products that overlap or are adjacent to each other, one way is to arrange the goods on the shelves according to multiple arrangements, and then a camera shoots the goods. Because there are multiple arrangements of the goods on the shelves, it is not easy to realize all of the arrangements of goods. The following disclosure will describe some embodiments of the goods modeling data generation device and the goods modeling data generation method.

Figure 1:
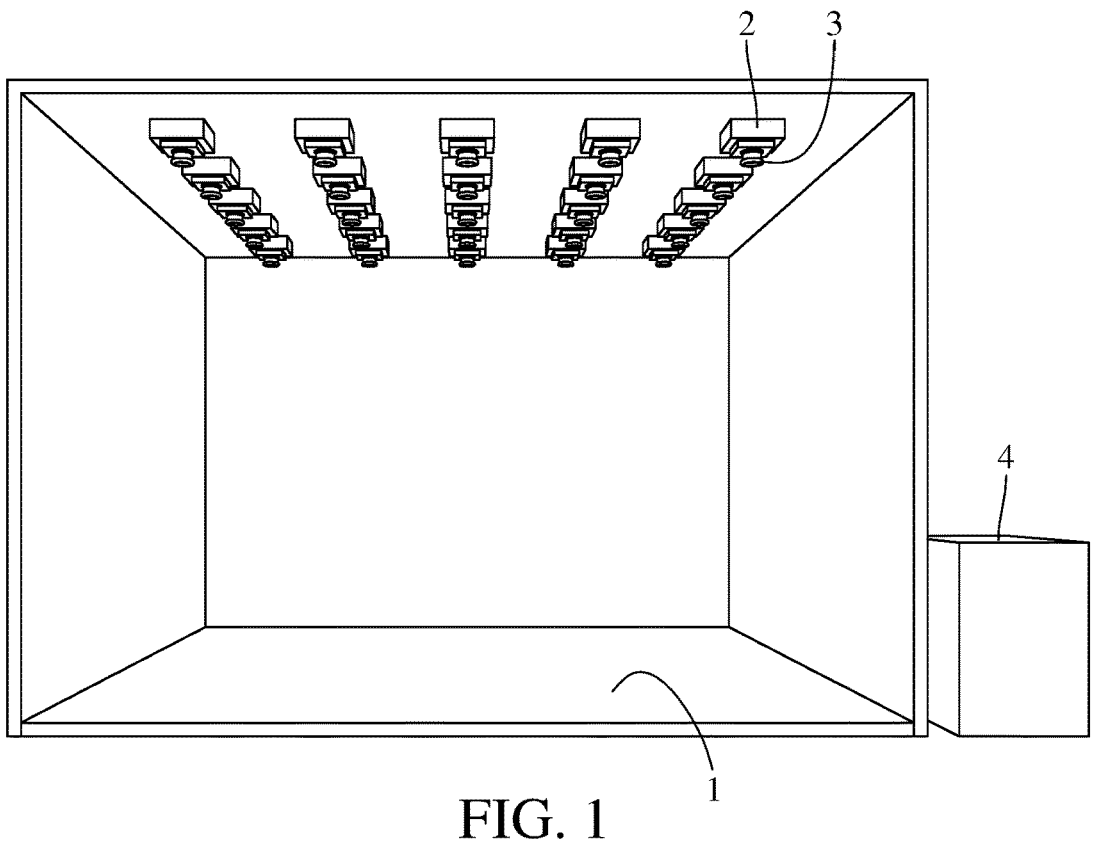
FIG. 1 is a schematic diagram of a goods modeling data generating device according to an embodiment of this disclosure.

FIG. 1 is a schematic diagram of a goods modeling data generating device according to an embodiment of this disclosure. Please refer to FIG. 1, the goods modeling data generating device comprise a platform 1, multiple racks 2, multiple cameras 3, and a management host 4. The racks 2 are fixed above the platform 1 in an array form, for example, can be fixed to a ceiling or connected to a top of the platform 1, and the cameras 3 are fixed to the racks 2 respectively. The cameras 3 are electrically connected to the management host 4 through wireless communication or wired communication. The management host 4 comprises a processor, a memory device, and a communication device. The management host 4 communicates with the cameras 3 through the communication device so as to receive image data from the cameras 3. The processor can execute methods or steps recited in FIG. 3, FIG. 7A, FIG. 7B and/or embodiments of this disclosure, and the memory device can store the image data. In one embodiment, the cameras 3 all face the platform 1 along the same direction, for example, the cameras 3 all face downwards, in detail, the direction is substantially perpendicular to the platform 1. In one embodiment, the cameras 3 are wide-angle camera. In one embodiment, goods can be placed on the platform 1. In one embodiment, the cameras 3 are below the goods, or the cameras 3 are on the left and the goods is on the right. The positions of the cameras 3 and the goods are not limited in this disclosure.

Figure 2:
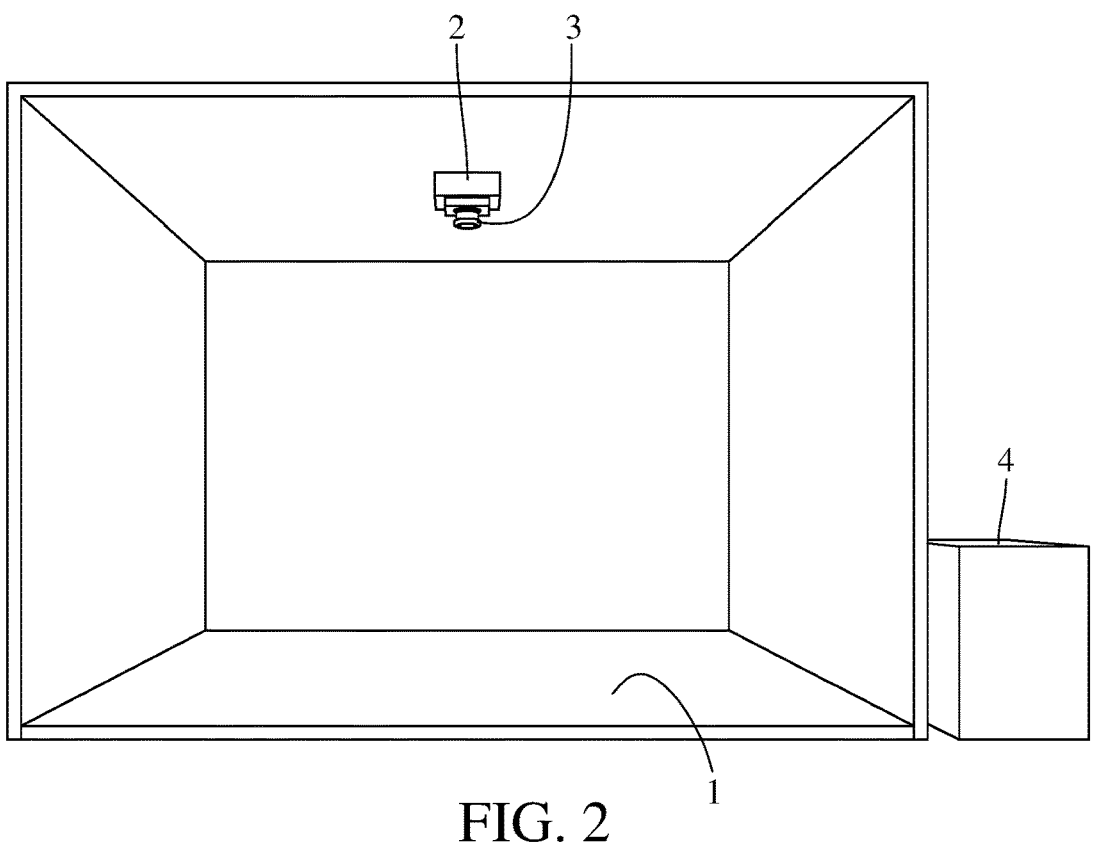
FIG. 2 is a schematic diagram of a goods modeling data generating device according to an embodiment of this disclosure.

FIG. 2 is a schematic diagram of a goods modeling data generating device according to an embodiment of this disclosure. The embodiment of FIG. 2 is similar to that of FIG. 1, and in the embodiment of FIG. 2, the number of the rack 2 above the platform 1 is one and the number of the camera 3 above the platform 1 is one.

Under the structure of the goods modeling data generating device in FIG. 1, the camera 3 and the goods can be fixed, and the cameras 3 can shoot the goods at one time (but not limited to the same time) to obtain goods images with multiple different viewing angles. In one embodiment, the number of goods images with multiple viewing angles is the same as the number of the cameras. For example, if the cameras 3 are arranged in a 5×5 array form, then the cameras 3 can obtain goods images with twenty-five viewing angles at one time. Under the structure of the goods modeling data generation device in FIG. 2, for obtaining goods images with multiple different viewing angles, in one embodiment, the camera 3 is fixed and the goods is sequentially placed on multiple different positions on the platform. Then, the camera 3 sequentially shoots the goods placed on different positions of the platform 1. In another embodiment, the goods is fixed on the platform 1 and the camera 3 can be moved to different positions. For example, the camera 3 can be moved by a slide mechanism and shoot the goods in multiple different positions in sequence. For the convenience of explanation, the goods modeling data generating device in FIG. 1 takes as an example as follows.

Figure 3:
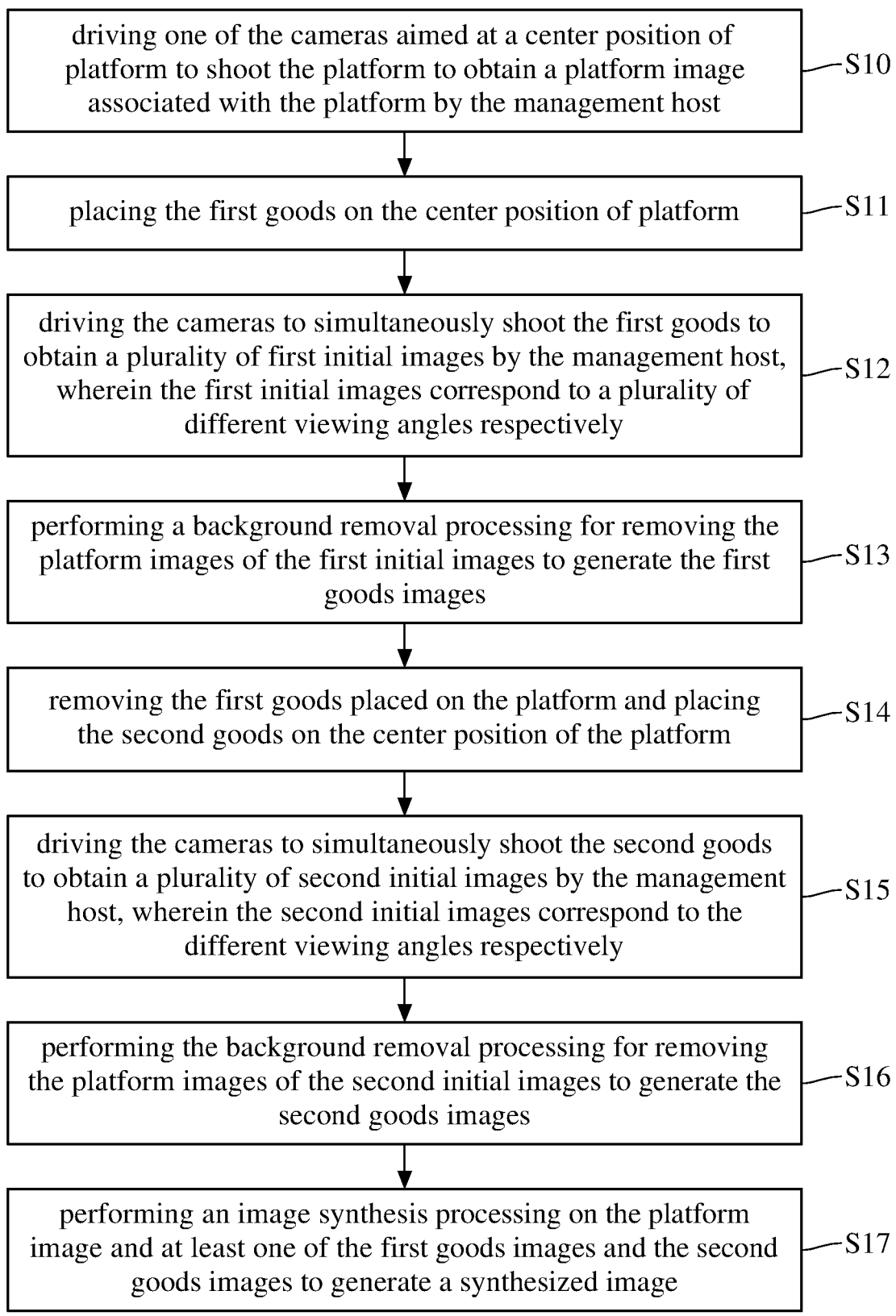
FIG. 3 is a flowchart of a method for generating goods modeling data according to an embodiment of this disclosure.

FIG. 3 is a flowchart of a method for generating goods modeling data according to an embodiment of this disclosure. Step S10 is driving one of the cameras 3 to shoot the platform 1 to obtain a platform image associated with the platform 1 by the management host 4, wherein the platform image includes an image of the platform 1. For example, a camera driven by the management host 4 is a camera aimed at the center of platform 1 among the cameras 3. In one embodiment, in step S10, driving the cameras 3 to shoot the platform 1 to obtain a plurality of platform images associated with the platform 1 by the management host 4, wherein the platform images include images of the platform 1 correspond to a plurality of different viewing angles respectively. In one embodiment, in step S10, no goods for modeling is placed on the platform.

Figure 4:
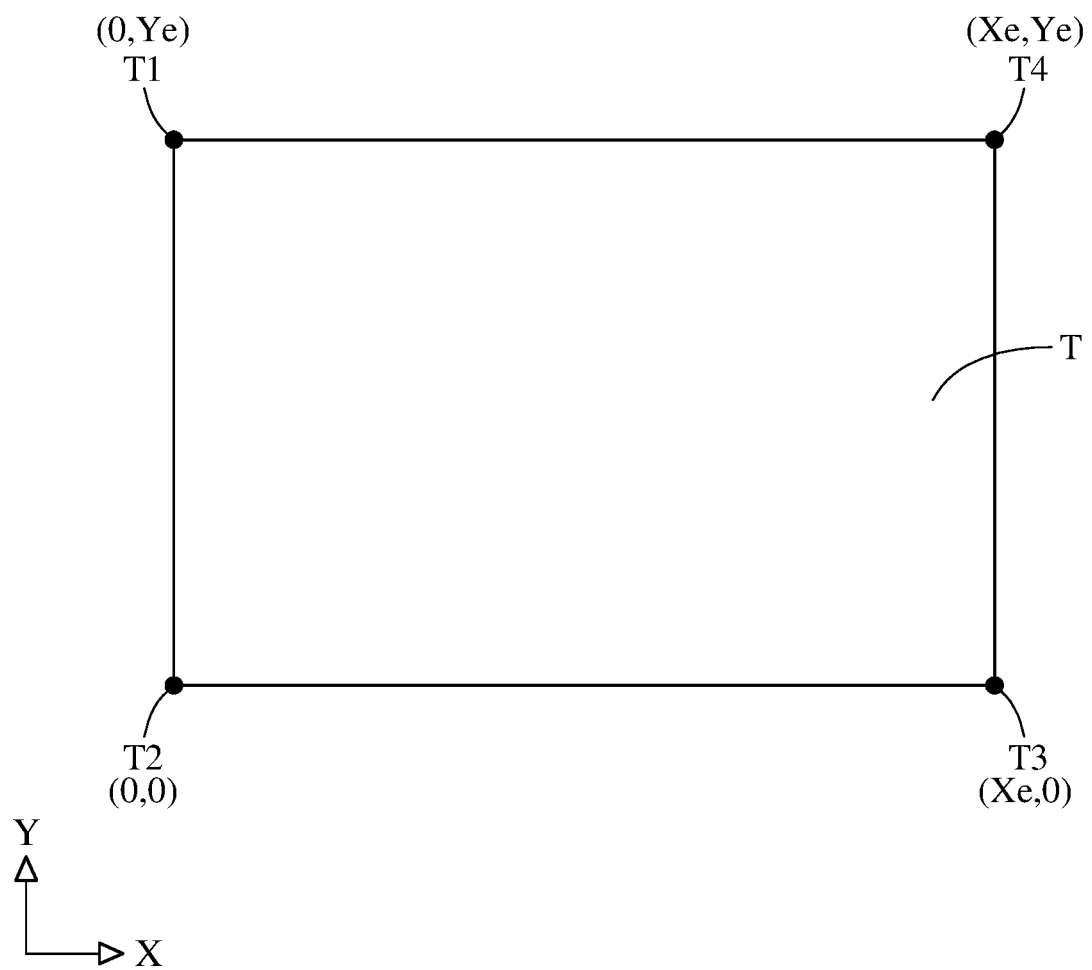
FIG. 4 is a schematic diagram of a platform image related to a platform according to an embodiment of the disclosure.

FIG. 4 is a schematic diagram of a platform image related to a platform according to an embodiment of the disclosure. In this embodiment, as shown in FIG. 4, a platform image T has the first to the fourth vertices T1, T2, T3, and T4, and coordinates of the first to the fourth vertices T1, T2, T3, and T4 are (0, Ye), (0,0), (Xe, 0) and (Xe, Ye), wherein Xe and Ye are both greater than zero, a lower bound of a horizontal axis of the platform image T is 0, a lower bound of a vertical axis of the platform image T is 0, an upper bound of a horizontal axis of the platform image T is Xe, and an upper bound of a vertical axis of the platform image T is Ye. The above coordinates are only examples and this disclosure does not limit the determination of coordinates.

Figure 5:
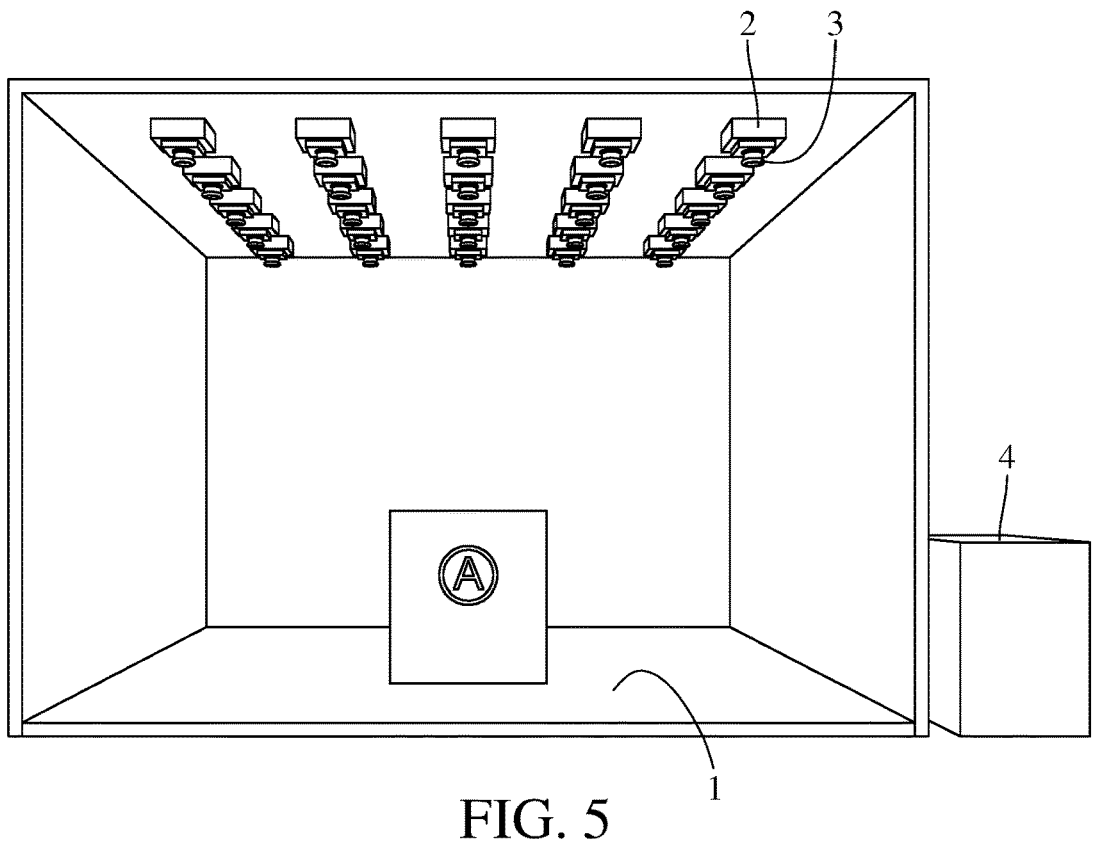
FIG. 5 is a schematic diagram of placing a first goods on the platform according to an embodiment of the disclosure.

FIG. 5 is a schematic diagram of placing a first goods on the platform according to an embodiment of the disclosure. Refer to FIG. 3 and FIG. 5 together, Step S11 is placing the first goods A on a center position of platform 1. Step S12 is driving the cameras 3 to simultaneously shoot the first goods A to obtain a plurality of first initial images by the management host 4, wherein the first initial images correspond to a plurality of different viewing angles respectively, and each of the first initial images contains a first goods image related to the first goods A and a platform image related to the platform 1. Step S13 is performing a background removal processing for removing the platform images of the first initial images to generate the first goods images, wherein the first goods images correspond to the different viewing angles respectively, and each of the first goods image includes an image of the first goods A. In one embodiment, the difference between the platform image(s) and the first initial images is compared to generate the first goods images, so that each of the first goods images include the image of the first goods A, and does not include the image of the platform 1.

Figure 6:
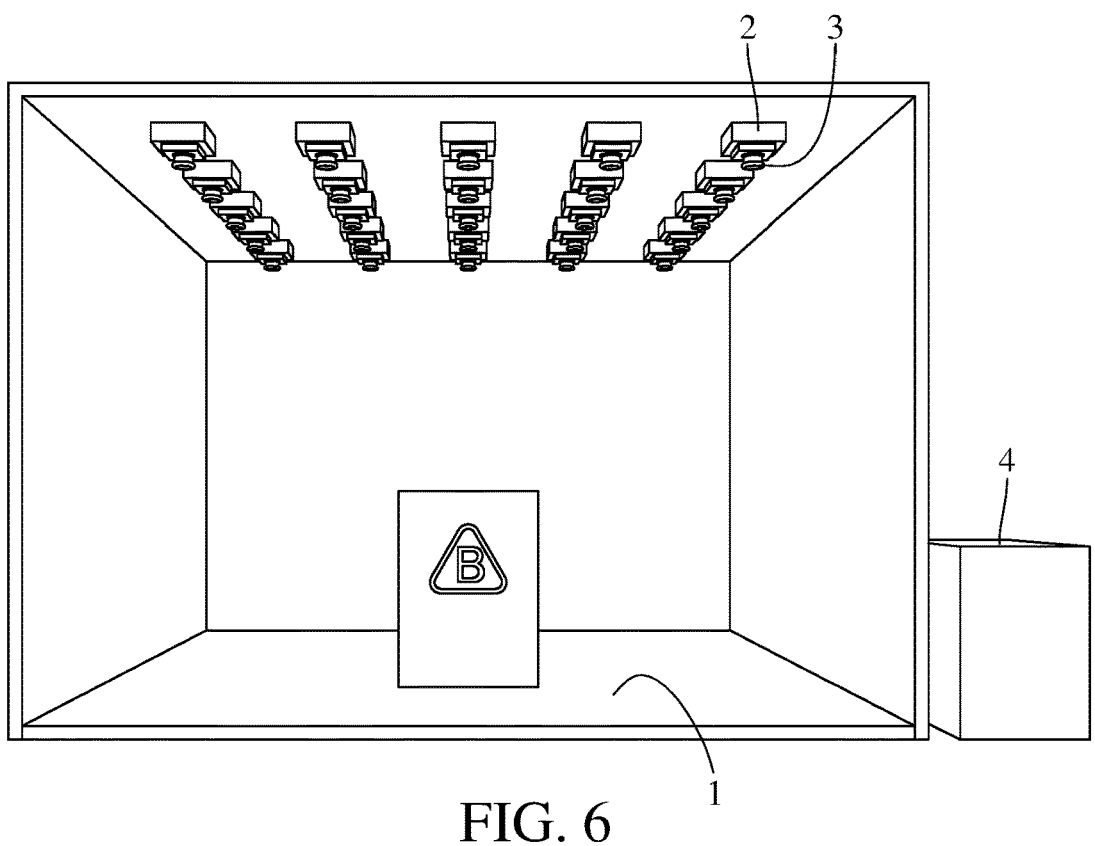
FIG. 6 is a schematic diagram of placing a second goods on the platform according to an embodiment of the disclosure.

FIG. 6 is a schematic diagram of placing a second goods on the platform according to an embodiment of the disclosure. Refer to FIG. 3 and FIG. 6 together, Step S14 is removing the first goods A placed on the platform 1 and placing the second goods B on the center position of the platform 1. Step S15 is driving the cameras 3 to simultaneously shoot the second goods B to obtain a plurality of second initial images by the management host 4, wherein the second initial images correspond to the different viewing angles respectively, and each of the second initial image includes a second goods image related to the second goods B and the platform image related to the platform 1. Step S16 is performing the background removal processing for removing the platform images of the second initial images to generate the second goods images, wherein the second goods images correspond to the different viewing angles respectively, and each of the second goods image includes an image of the second goods B. In one embodiment, the difference between the platform image and the second initial images is compared to generate the second goods images, so that each of the second goods images only include the image of the second goods B, and does not include the image of the platform 1. In other embodiments, if there are N types of goods, where N is a positive integer greater than or equal to three. Similarly, for example, the second goods B placed on the platform 1 is removed and then the third goods is placed on a center position of the platform 1, and then steps S15~S16 are performed to generate a plurality of third goods images, and then the third goods is removed and another goods is placed on the platform and so on, so as to generate N goods images related to N goods. In another embodiment, if there are M types of goods, wherein M is a positive integer greater than or equal to two. Similarly, for example, the second goods B placed on the platform 1 is removed and then the third goods is placed on a center position of the platform 1, and then steps S15~S16 are performed to generate a plurality of third goods images, and then the third goods is removed and another goods is placed on the platform and so on, so as to generate M goods images related to M goods.

As shown in FIG. 3, step S17 is performed after step S16, step S17 is performing an image synthesis processing on the platform image and at least one of the first goods images and the second goods images to generate a synthesized image, wherein the synthesized image comprises at least a plurality of adjacent or partially overlapping image areas which corresponds to the different viewing angles, and the image areas comprises a first image area and a second image area, the first image area comprises one of the first goods images or one of the second goods images, and the second image area comprises one of the first goods images or one of the second goods images. Specifically, two adjacent or partially overlapping goods images correspond to different viewing angles respectively, but may belong to the same type of goods, or belong to different types of goods. In one embodiment, when there are N types of goods, the management host 4 performs the image synthesis processing on the platform image and at least one of the first goods images to the N-th goods images to generate a synthesized image, and the synthesized image comprises at least a plurality of adjacent or partially overlapping image areas which corresponds to the different viewing angles, and each of the image areas comprises one of the first goods images to the N-th goods images. In another embodiment, when there are M types of goods, wherein M is a positive integer greater than or equal to two, the management host 4 performs the image synthesis processing on the platform image and at least one of the first goods images to the M-th goods images to generate a synthesized image, and the synthesized image comprises at least a plurality of adjacent or partially overlapping image areas which corresponds to the different viewing angles, and each of the image areas comprises one of the first goods images to the M-th goods images.

In this embodiment, driving the cameras, performing the background removal, and generating the synthesized image are performed by the same management host. In another embodiment, driving the cameras, performing the background removal, and generating the synthesized image can be performed through different management hosts.

Regarding the correspondence between the cameras and the viewing angles of the goods images, for example, when there are multiple cameras, the goods image with the upper left viewing angle is captured by the camera in the lower right corner. On the contrary, the goods image with the upper right viewing angle is captured by the camera in the lower left corner. When the number of cameras is one and the position of the goods is movable, the camera is fixed at a center position and shoots the goods placed on the upper left corner of the platform to obtain the goods image with the upper left viewing angle. When the number of cameras is one and the position of the camera is movable, the goods is fixed at a center position, the camera is moved to the lower right corners and shoots the goods to obtain the goods image with the upper left viewing angle.

Figure 7A:
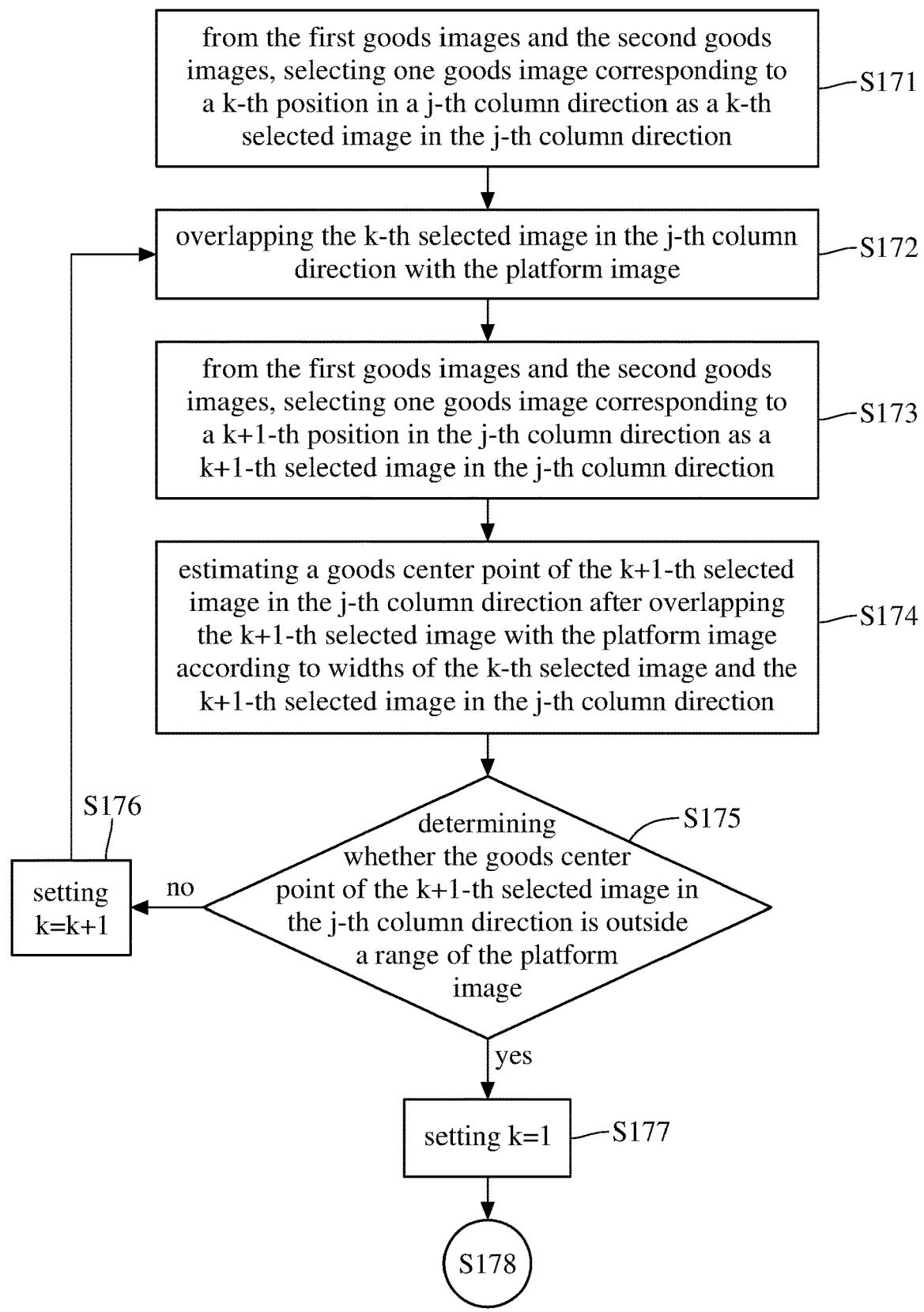
FIGS. 7A and 7B are detailed steps of the image synthesis processing of FIG. 3 according to an embodiment of the disclosure.
Figure 7B:
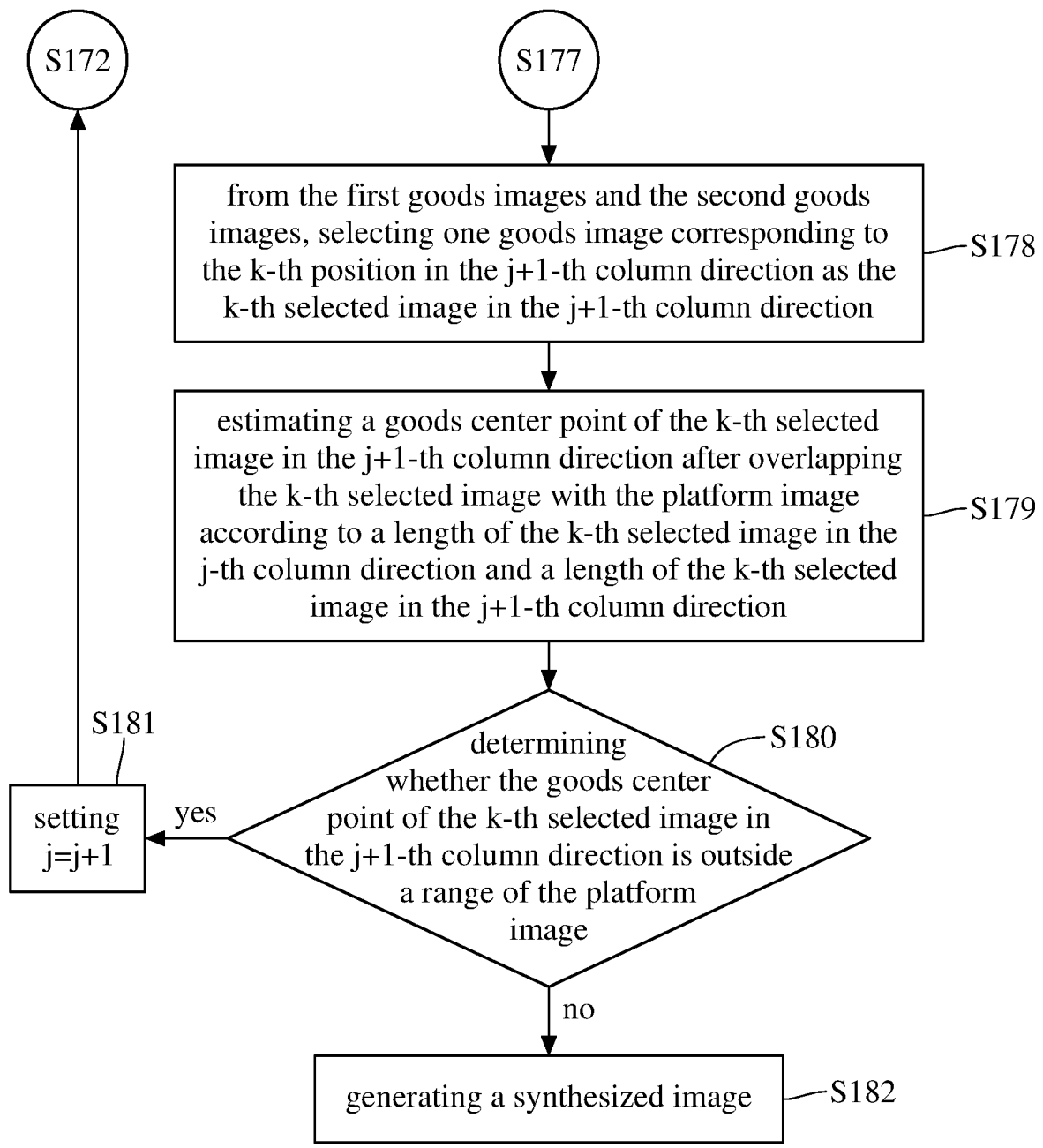

FIGS. 7A and 7B are detailed steps of the image synthesis processing of FIG. 3 according to an embodiment of the disclosure.

Figure 8A:
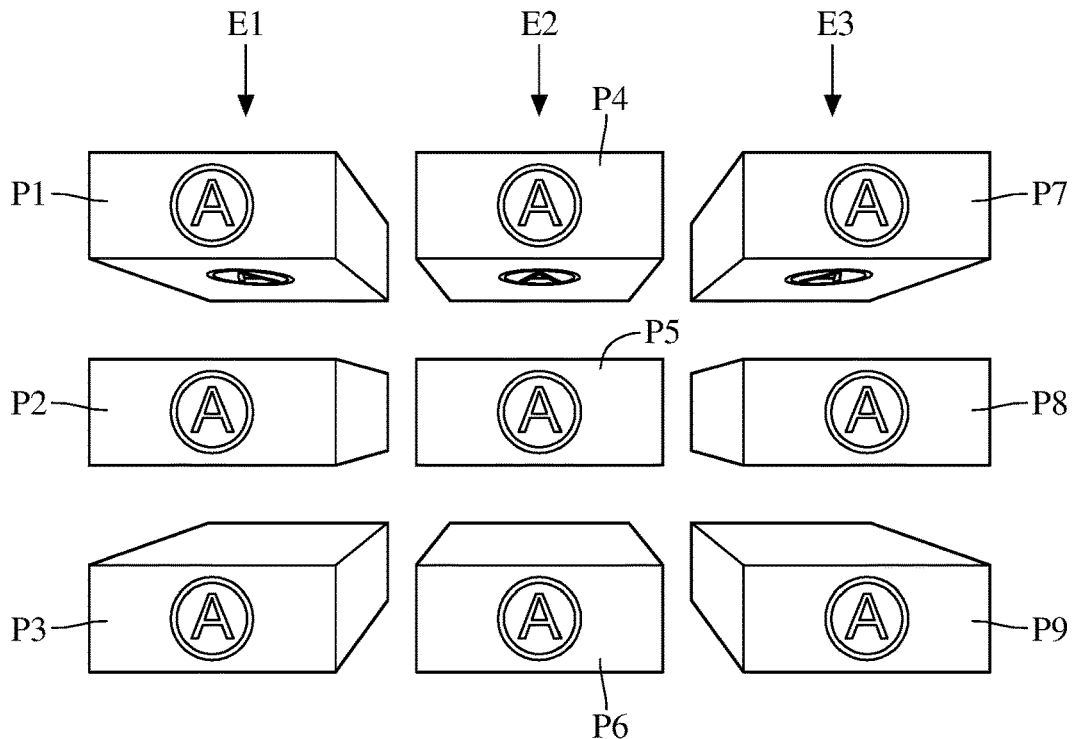
FIG. 8A is a schematic diagram of a plurality of first goods images according to an embodiment of the disclosure.
Figure 8B:
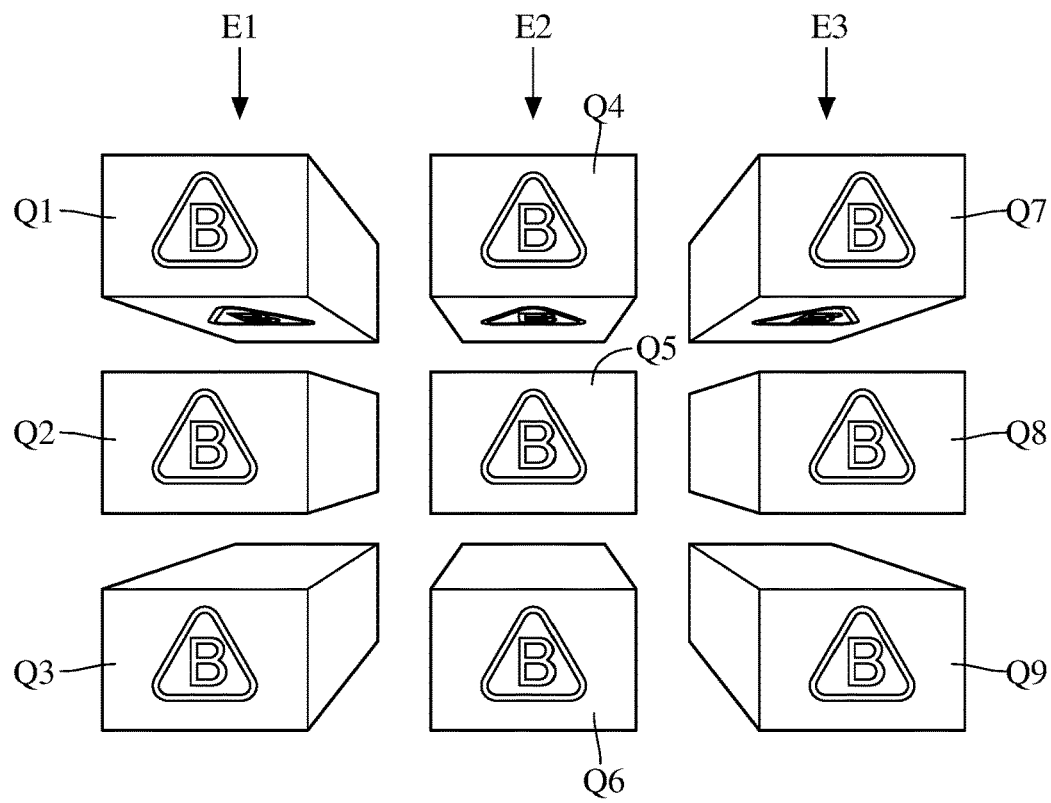
FIG. 8B is a schematic diagram of a plurality of second goods images according to an embodiment of the disclosure.

FIG. 8A is a schematic diagram of a plurality of first goods images according to an embodiment of the disclosure, and FIG. 8B is a schematic diagram of a plurality of second goods images according to an embodiment of the disclosure. Refer to FIGS. 8A and 8B, the cameras 3 are arranged in a 3×3 array form, the cameras 3 can obtain nine first goods images P1~P9 with different nine viewing angles by shooting the first goods at one time and obtain nine second goods images Q1~Q9 with the different nine viewing angles by shooting the second goods at one time. The first goods images P1~P9 comprise three first goods images P1~P3 in the first column direction E1. The first goods images P1~P9 comprise three first goods images P4~P6 in the second column direction E2. The first goods images P1~P9 comprise three first goods images P7~P9 in the third column direction E3. Similarly, the second goods images Q1~Q9 comprise three second goods images Q1~Q3 in the first column direction E1. The second goods images Q1~Q9 comprise three second goods images Q4~Q6 in the second column direction E2. The second goods images Q1~Q9 comprise three second goods images Q7~Q9 in the third column direction E3.

The following embodiment of the image synthesis processing is applied to two different goods, but the image synthesis processing of this disclosure is not only limited to be applied to two different goods, and can also be applied to three or more than three different goods. In step S171, from the first goods images and the second goods images, selecting one goods image corresponding to a k-th position in a j-th column direction as a k-th selected image in the j-th column direction, wherein an initial value of the j is 1, an initial value of the k is 1. In one embodiment, for example, when j=1 and k=1, the first goods image P1 corresponding to the first position in the first column direction is selected from the first goods images P1~P9 and the second goods images Q1~Q9. In one embodiment, step S171 can comprise two sub-steps, one of the sub-steps is selecting the goods at first and the other of the sub-steps is selecting a corresponding image location related to the selected goods. For example, a first goods is selected at first, and then a first goods image which corresponds to a k-th position in a j-th column direction is selected as a k-th selected image in the j-th column direction. In other embodiment, if there are N types of goods, wherein N is a positive integer greater than or equal to three, and step S171 can be that from the first goods images to the N-th goods images, selecting one goods image corresponding to a k-th position in a j-th column direction as a k-th selected image in the j-th column direction. In another embodiment, if there are M types of goods, wherein M is a positive integer greater than or equal to two, and step S171 can be that from the first goods images to the M-th goods images, selecting one goods image corresponding to a k-th position in a j-th column direction as a k-th selected image in the j-th column direction.

Step S172 is overlapping the k-th selected image in the j-th column direction with the platform image, wherein the k-th selected image in the j-th column direction has a center point after overlapping with the platform image. The center point of the k-th selected image in the j-th row direction has a vertical coordinate and a horizontal coordinate. In one embodiment, overlapping can be attaching to the platform image or replacing a part of the platform image.

Figure 9:
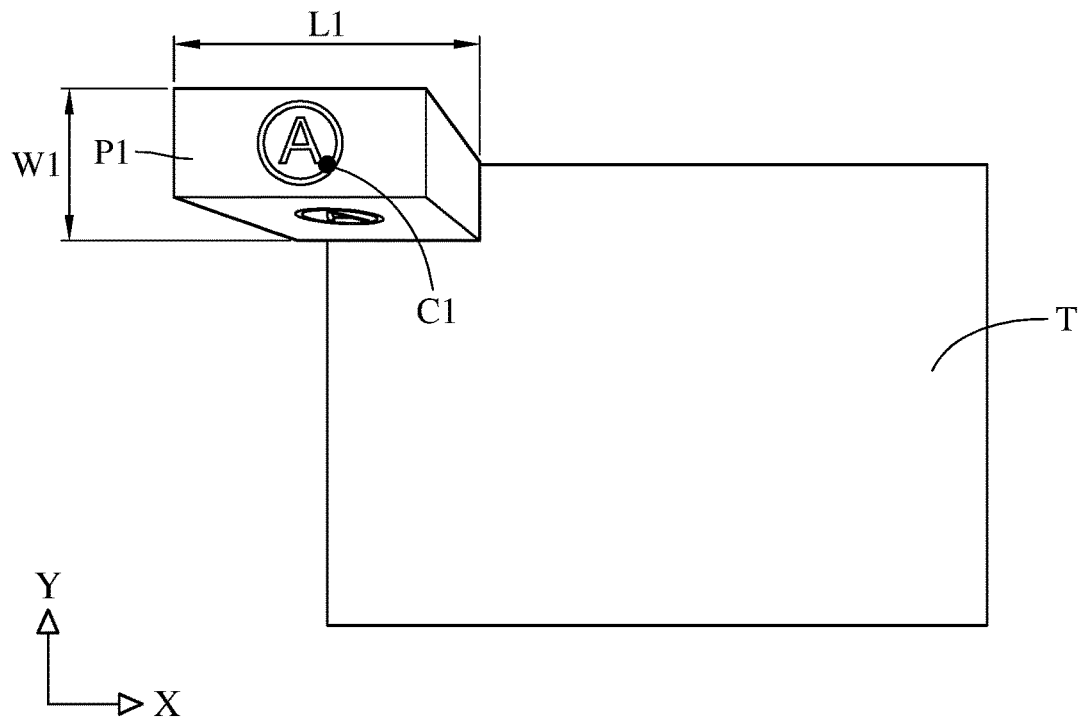
FIG. 9 is a schematic diagram of performing step S172 of FIG. 7A for the first time according to an embodiment of the disclosure.

FIG. 9 is a schematic diagram of performing step S172 of FIG. 7A for the first time according to an embodiment of the disclosure. The first goods image P1 is selected from the first goods images P1~P9 and the second goods images Q1~Q9 to be a first selected image, and the first goods image P1 overlaps with the platform image T, wherein the first goods image P1 has a first center point C1, the first goods image P1 has a length L1 in a X axis direction and has a width W1 in a Y axis direction. The first center point C1 has a first vertical coordinate and a first horizontal coordinate. In one embodiment, for example, the X-Y coordinate of the first center point C1 is (0, Ye) shown in FIG. 4.

In step S173, from the first goods images and the second goods images, selecting one goods image corresponding to a k+1-th position in the j-th column direction as a k+1-th selected image in the j-th column direction. In one embodiment, a first goods image corresponding to the k+1-th position in the j-th column direction is selected from the first goods images or the second goods image corresponding to the k+1-th position in the j-th column direction is selected from the second goods images. For example, when j=1 and k=1, the second goods image Q2 corresponding to the second position in the first column direction is selected from the first goods images P1~P9 and the second goods images Q1~Q9. In one embodiment, Step S173 can comprise two sub-steps, one of the sub-steps is selecting a goods at first, and the other of the sub-steps is selecting a corresponding image location associated with the selected goods. For example, a second goods is selected at first, and then one of the second goods images corresponding to the k+1-th position in the j-th column direction is selected as the k+1-th selected image in j-th column direction. In one embodiment, if there is no image corresponding to the k+1-th position in the j-th column direction, for example, the k+1-th position may have exceeded the range of the platform image, and step S173 can be skipped. In other embodiment, if there are N types of goods, wherein N is a positive integer greater than or equal to three, step S173 may be that from the first goods images to the N-th goods images, selecting one goods image corresponding to the k+1-th position in the j-th column direction as the k+1-th selected image in the j-th column direction. In another embodiment, if there are M types of goods, wherein M is a positive integer greater than or equal to two, step S173 may be that from the first goods images to the M-th goods images, selecting one goods image corresponding to the k+1-th position in the j-th column direction as the k+1-th selected image in the j-th column direction.

Step S174 is estimating a goods center point of the k+1-th selected image in the j-th column direction after overlapping the k+1-th selected image with the platform image according to a width of the k-th selected image in the j-th column direction and a width of the k+1-th selected image in the j-th column direction. The goods center point of the k+1-th selected image in the j-th column direction has a horizontal coordinate and a vertical coordinate, and a difference between the estimated goods center points of the k+1-th selected image and the k-th selected image in the j-th column direction substantially equals to an average of the widths of the k-th selected image and the k+1-th selected image in the j-th column direction. In one embodiment, the horizontal coordinate of the goods center point of the k-th selected image in the j-th column direction substantially equals to the horizontal coordinate of the goods center point of the k+1-th selected image in the j-th column direction. A difference between the vertical coordinates of the goods center points of the k-th selected image and the k+1-th selected image in the j-th column direction substantially equals to the average of the widths of the k-th selected image and the width of the k+1-th selected image in the j-th column direction. Step 175 is determining whether the goods center point of the k+1-th selected image in the j-th column direction is outside a range of the platform image T. Specifically, when the second vertex T2 of the platform image T is defined as the origin of the Cartesian coordinate system, the vertical coordinate lower limit is 0. Therefore, when the estimated vertical coordinate of the center point of the k+1-th selected image in the j-th column direction is determined to be not less than the vertical coordinate lower limit, which means the goods center point of the k+1-th selected image in the j-th column direction is not outside the range of the platform image T, and then step S176 is performed. Step S176 is setting k=k+1. After step S176, step S172 is performed. In one embodiment, if there is no image corresponding to the k+1-th position in the j-th column direction in step S173, for example, a goods image in the k+1-th position may have exceeded the range of the platform image, steps S173~175 can be skipped and then step S177 is performed, wherein step S177 is setting k=1.

Figure 10:
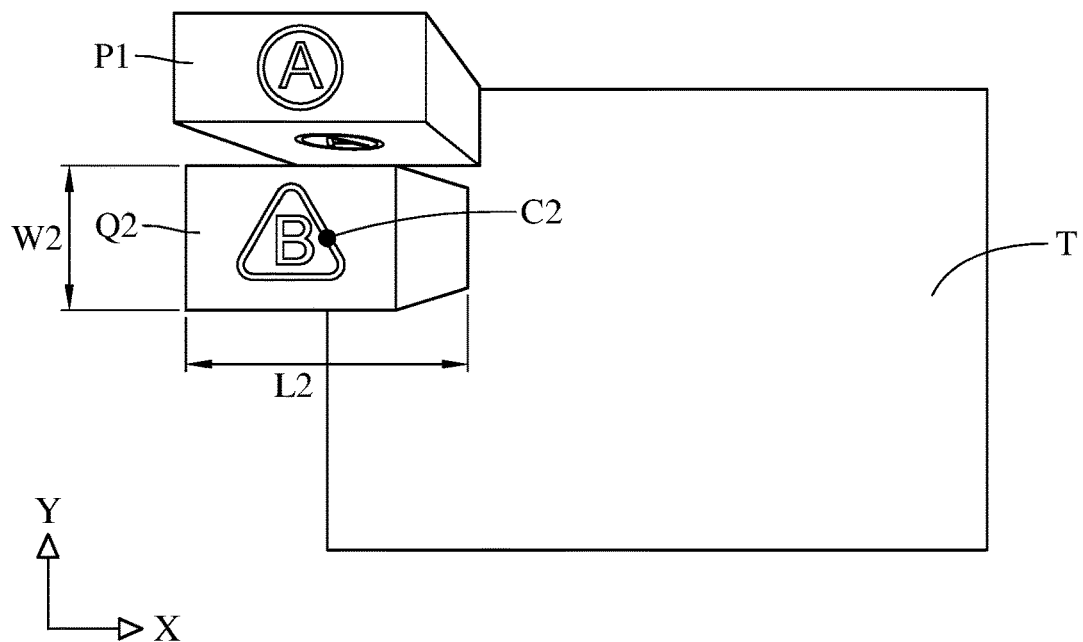
FIG. 10 is a schematic diagram of performing step S172 of FIG. 7A for the second time according to an embodiment of the disclosure.

FIG. 10 is a schematic diagram of performing step S172 of FIG. 7A for the second time according to an embodiment of the disclosure. In detail, the first goods image P1 has overlapped the platform image T1, and then in step S173, the second goods image Q2 is selected as the second selected image from the first goods images P1~P9 and the second goods images Q1~Q9. Wherein, the second goods image Q2 has a second center point C2 and the second center point C2 has a second vertical coordinate and a second horizontal coordinate, and the second goods image Q2 has a length L2 in the X axis direction and a width W2 in the Y axis direction. In step S174, the processor of the management host 4 estimates the second center point C2 of the second goods image Q2. In step S175, the processor of the management host 4 determines that the second vertical coordinate of the second center point C2 of the second goods image Q2 is not less than the vertical coordinate lower limit (for example, the vertical coordinate lower limit can be 0), and then step S176 is performed, wherein step S176 is setting k=k+1. After performing step S176, step S172 is performed to overlap the second goods image Q2 with the platform image T, wherein the difference between the first center point C1 of the first goods image P1 and the second center point C2 of the second goods image Q2 substantially equals to an average of the width W1 and the width W2. In an embodiment, the X-Y coordinate of the first center point C1 of the first goods image P1 is (0, Ye), and the X-Y coordinate of the second center point C2 of the second goods image Q2 is (0, Ye−(W1+W2)/2).

Figure 11:
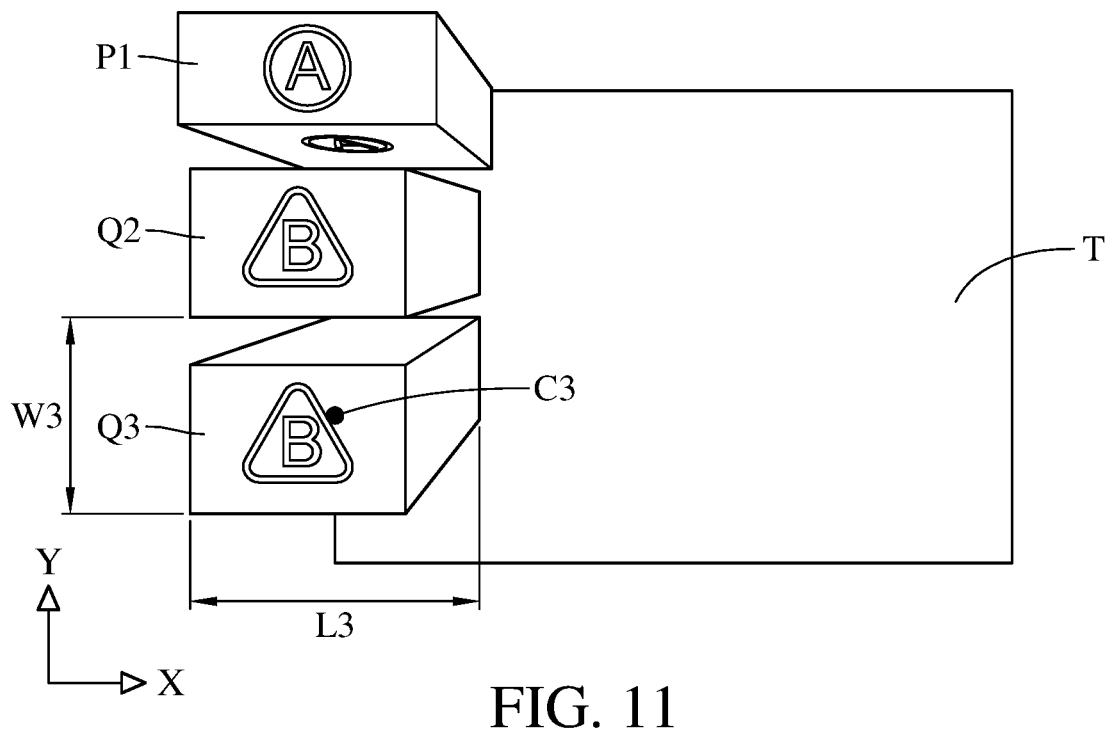
FIG. 11 is a schematic diagram of performing step S172 of FIG. 7A for the third time according to an embodiment of the disclosure.

FIG. 11 is a schematic diagram of performing step S172 of FIG. 7A for the third time according to an embodiment of the disclosure. In detail, the first goods image P1 and the second goods image Q2 have overlapped the platform image T1, and then in step S173, the second goods image Q3 is selected from the first goods images P1~P9 and the second goods images Q1~Q9. Wherein, the second goods image Q3 has a third center point C3 and the third center point C3 has a third vertical coordinate and a third horizontal coordinate, and the third goods image Q3 has a length L3 in the X axis direction and a width W3 in the Y axis direction. In step S174, the processor of the management host 4 estimates the third center point C3 of the second goods image Q3. In step S175, the processor of the management host 4 determines that the third vertical coordinate of the third center point C3 of the second goods image Q3 is not less than the vertical coordinate lower limit (for example, the vertical coordinate lower limit can be 0), and then step S176 is performed, wherein step S176 is setting k=k+1. After performing step S176, step S172 is performed to overlap the second goods image Q3 with the platform image T, wherein the difference between the second center point C2 of the second goods image Q2 and the third center point C3 of the second goods image Q3 substantially equals to an average of the width W2 and the width W3. In an embodiment, the X-Y coordinate of the second center point C2 of the second goods image Q2 is (X2, Y2), and the X-Y coordinate of the third center point C3 of the second goods image Q3 is (X2, Y2−(W2+W3)/2).

When the estimated goods center point of the k+1-th selected image in the j-th column direction is outside the range of the platform image T, step S177 is performed. Step S177 is setting k=1. In, step S178, from the first goods images and the second goods images, selecting one goods image corresponding to the k-th position in the j+1-th column direction as the k-th selected image in the j+1-th column direction. In one embodiment, Step S178 can comprise two sub-steps, one of the sub-steps is selecting a goods at first, and the other of the sub-steps is selecting a corresponding image location associated with the selected goods. For example, a first goods is selected at first, and then one of the first goods images which corresponds to the k-th position in the j+1-th column direction is selected as the k-th selected image in j+1-th column direction. In one embodiment, if there is no image corresponding to the k-th position in the j+1-th column direction, for example, the k-th position may have exceeded the range of the platform image, and step S178 can be skipped. In other embodiment, if there are N types of goods, wherein N is a positive integer greater than or equal to three, step S178 may that from the first goods images to the N-th goods images, selecting one goods image corresponding to the k-th position in the j+1-th column direction as the k-th selected image in the j+1-th column direction. In another embodiment, if there are M types of goods, wherein M is a positive integer greater than or equal to two, step S178 may be that from the first goods images to the M-th goods images, selecting one goods image corresponding to the k-th position in the j+1-th column direction as the k-th selected image in the j+1-th column direction.

Step S179 is estimating a goods center point of the k-th selected image in the j+1-th column direction after overlapping the k-th selected image with the platform image according to a length of the k-th selected image in the j-th column direction and a length of the k-th selected image in the j+1-th column direction. The goods center point of the k-th selected image in the j+1-th column direction has a horizontal coordinate and a vertical coordinate, and a difference between the goods center point of the k-th selected image in the j+1-th column direction and the goods center point of the k-th selected image in the j-th column direction substantially equals to an average of the length of the k-th selected image in the j+1-th column direction and the length of the k-th selected image in the j-th column direction. Step 180 is determining whether the goods center point of the k-th selected image in the j+1-th column direction is outside a range of the platform image T. Specifically, when the second vertex T2 of the platform image T is defined as the origin of the Cartesian coordinate system, the horizontal coordinate upper limit is Xe. Therefore, when an estimated horizontal coordinate of the center point of the k-th selected image in the j+1-th column direction is determined to be less than the horizontal coordinate upper limit, which means the goods center point of the k-th selected image in the j+1-th column direction is not outside the range of the platform image T, and then step S181 is performed. Step S181 is setting j=j+1. After step S181, step S172 is performed. In one embodiment, if there is no image corresponding to the k-th position in the j+1-th column direction in step S178, for example, a goods image in the j+1-th position may have exceeded the range of the platform image, steps S178~180 can be skipped and then step S182 is performed, wherein step S182 is generating a synthesized image.

Figure 12:
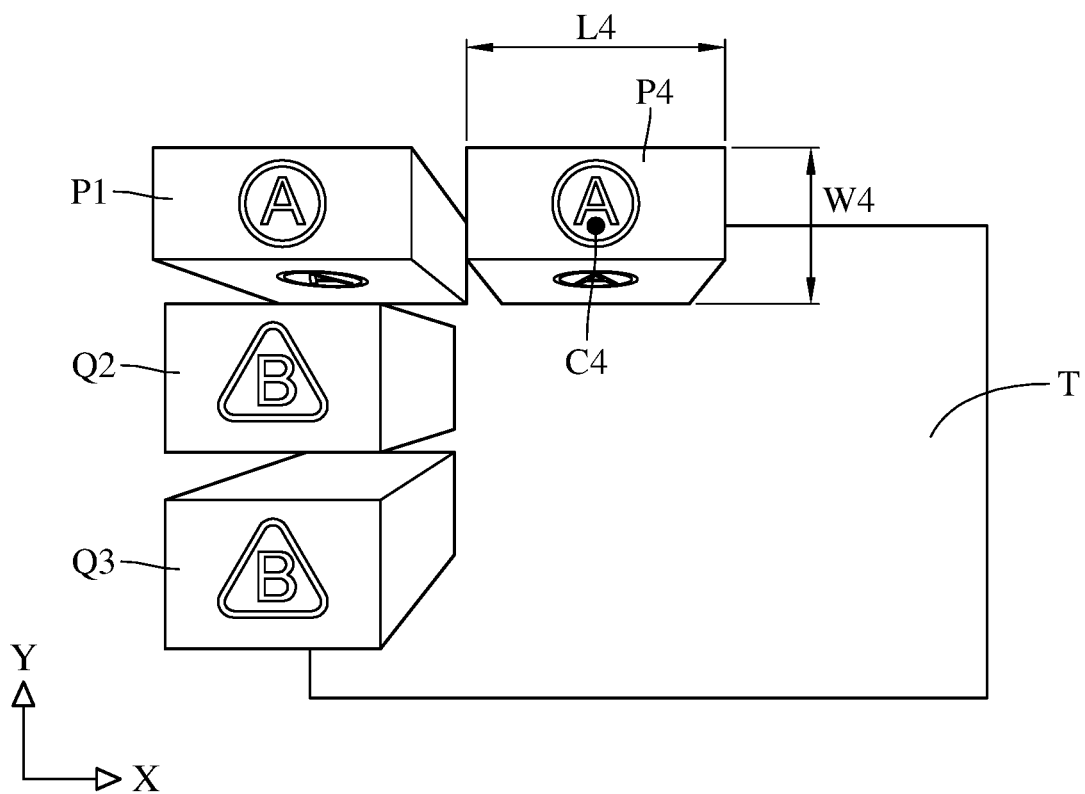
FIG. 12 is a schematic diagram of performing step S172 of FIG. 7A for the fourth time according to an embodiment of the disclosure.

FIG. 12 is a schematic diagram of performing step S172 of FIG. 7A for the fourth time according to an embodiment of the disclosure. In detail, the first goods image P1, the second goods image Q2 and the second goods image Q3 have overlapped the platform image T, and then the first goods image P4 is selected from the first goods images P1~P9 and the second goods images Q1~Q9. The first goods image P4 has a fourth center point P4 and the fourth center point P4 has a fourth vertical coordinate and a fourth horizontal coordinate, and the fourth goods image P4 has a length L4 in the X axis direction and a width W4 in the Y axis direction. The processor of the management host 4 determines that the fourth horizontal coordinate of the fourth center point C4 of the first goods image P4 is less than the horizontal coordinate upper limit (for example, the horizontal coordinate upper limit can be Xe), and then the first goods image P4 is overlapped with the platform image T, wherein the difference between the fourth center point C4 of the first goods image P4 and the first center point C1 of the first goods image P1 is substantially equal to an average of the length L1 and the length L4. In an embodiment, the X-Y coordinate of the first center point C1 of the first goods image P1 is (0, Ye), and the X-Y coordinate of the fourth center point C4 of the first goods image P4 is ((L1+L4)/2, Ye).

When the estimated goods center point of the k-th selected image in the j+1-th column direction is outside a range of the platform image T, step S182 is performed. In step S182, a synthesized image is generated according the platform image which is overlapped with at least one of the first goods images and the second goods images.

The management host 4 executes the image synthesis processing of FIG. 7A and FIG. 7B for multiple times to obtain multiple different synthesized images. These synthesized images can be used as modeling data, and a goods model can be trained by the machine learning algorithm (such as Faster regions with convolution neural network) based on these synthesized images. In one embodiment, after the goods model is generated, the goods placed on the platform can be identified by the goods model.

With respect to the embodiment of the image synthesis processing in FIGS. 7A and 7B, the first goods image or the second goods image sequentially overlaps the platform image from the upper left corner of the platform image to the lower right corner of the platform image. However, the image synthesis processing of this disclosure is not limited to the above embodiment. The first goods image or the second goods image can also overlap the platform image from the left edge of the platform image to the middle position of the platform image, and then from the right edge of the platform image to the middle position of the platform image. In one embodiment, there are N types of goods, wherein N is a positive integer greater than or equal to three, one goods image can be selected form the first goods images to the N-th goods images to overlap the platform image from the upper left corner of the platform image to the lower right corner of the platform image and from the upper edge of the platform image to the lower edge of the platform image. In another embodiment, at least one of the first goods images to the N-th goods images overlaps the platform image by placing in different column directions sequentially, placing in different row directions sequentially, placing from the upper edge of the platform image to the lower edge of the platform image, placing from the lower edge of the platform to the upper edge of the platform image, placing from the left edge of the platform image to the right edge of the platform image, placing from the right edge of the platform image to the left edge of the platform image, placing from the upper edge of the platform image to the lower edge of the platform image in one column and then placing from the lower edge of the platform image to the upper edge of the platform image in a next column, placing from the lower edge of the platform image to the upper edge of the platform image in one column and then placing from the upper edge of the platform image to the lower edge of the platform image in a next column, placing from the left edge of the platform image to the right edge of the platform image in one row and then placing from the right edge of the platform image to the left edge of the platform image in a next row, placing from the right edge of the platform image to the left edge of the platform image in one row and then placing from the left edge of the platform image to the right edge of the platform image in a next row, placing in spiral shape from inside to outside, placing in spiral shape from outside to inside, or placing randomly. The placement method of the goods images and the proportion of the goods placed on the platform can be determined by system or user parameters. In another embodiment, there are M types of goods, wherein M is a positive integer greater than or equal to two, one goods image can be selected form the first goods images to the M-th goods images to overlap the platform image from the upper left corner of the platform image to the lower right corner of the platform image and from the upper edge of the platform image to the lower edge of the platform image. In another embodiment, at least one of the first goods images to the M-th goods images overlaps with the platform image by placing in different column directions sequentially, placing in different row directions sequentially, placing from the upper edge of the platform image to the lower edge of the platform image, placing from the lower edge of the plat form to the upper edge of the platform image, placing from the left edge of the platform image to the right edge of the platform image, placing from the right edge of the platform image to the left edge of the platform image, placing from the upper edge of the platform image to the lower edge of the platform image in one column and then placing from the lower edge of the platform image to the upper edge of the platform image in a next column, placing from the lower edge of the platform image to the upper edge of the platform image in one column and then placing from the upper edge of the platform image to the lower edge of the platform image in a next column, placing from the left edge of the platform image to the right edge of the platform image in one row and then placing from the right edge of the platform image to the left edge of the platform image in a next row, placing from the right edge of the platform image to the left edge of the platform image in one row and then placing from the left edge of the platform image to the right edge of the platform image in a next row, placing in spiral shape from inside to outside, placing in spiral shape from outside to inside, or placing randomly. The placement method of the goods images and the proportion of the goods placed on the platform can be determined by system or user parameters.

In one embodiment, the method of the image synthesis processing further comprises rotating, shifting, or adjusting the brightness of the k-th selected image in the j-th column direction after step S172 and before step S173. Specifically, when multiple different goods are placed on the platform 1, two goods that are adjacent to each other or partially overlapping may have different brightness, or the center points of two goods that are adjacent to each other or partially overlapping may are not be aligned with the same vertical coordinate or the same horizontal coordinate. Therefore, by rotating, shifting or adjusting the brightness of the first goods image or the second goods image overlapping with the platform image, the actual situation of multiple goods placed on the platform can be simulated, thereby improving the recognition rate of the goods model.

In one embodiment, when the management host 4 executes step S172, it further includes determining whether to overlap the k-th selected image in the j-th column direction with the platform image. Specifically, the appearance rate of each image is adjusted to simulate the situation where the platform is not filled with goods, for example, the goods may have been taken away from the platform, thereby adjusting the appearance rate can improve the recognition rate of the goods model.

In one embodiment, a percentage can be set or the upper limit of the placement coordinate can be set. For example, in FIGS. 7A and 7B, step S182 is performed after the goods images are sequentially placed on the coordinate (X1,Y1), wherein X1 is less than or equal to Xe, and Y1 is less than or equal to Ye, which can simulate the situation where the platform is not filled with goods.

Figure 13:
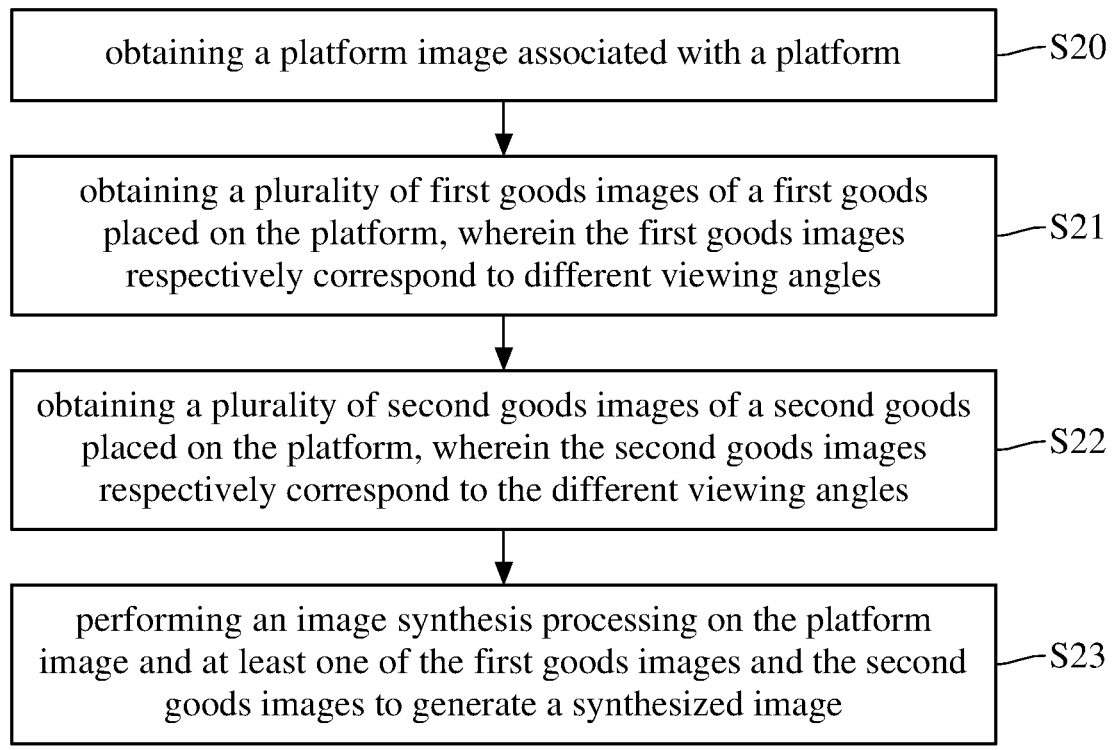
FIG. 13 is a flowchart of a method for generating goods modeling data according to an embodiment of this disclosure.

FIG. 13 is a flowchart of a method for generating goods modeling data according to an embodiment of this disclosure. Refer to FIG. 13, step S20 is obtaining a platform image associated with a platform. In one embodiment, an image captured by the camera includes a platform image associated with the platform and a background image associated with other objects which is different from the platform, the platform image can be obtained by removing the background image. Step S21 is obtaining a plurality of first goods images of a first goods placed on the platform, wherein the first goods images respectively correspond to different viewing angles. Step S22 is obtaining a plurality of second goods images of a second goods placed on the platform, wherein the second goods images respectively correspond to the different viewing angles. Step S23 is performing an image synthesis processing on the platform image and at least one of the first goods images and the second goods images to generate a synthesized image, wherein the synthesized image comprises at least a plurality of adjacent or partially overlapping image areas which corresponds to the different viewing angles, and the image areas comprises a first image area and a second image area, the first image area comprises one of the first goods images or one of the second goods images, and the second image area comprises one of the first goods images or one of the second goods images.

Figure 14:
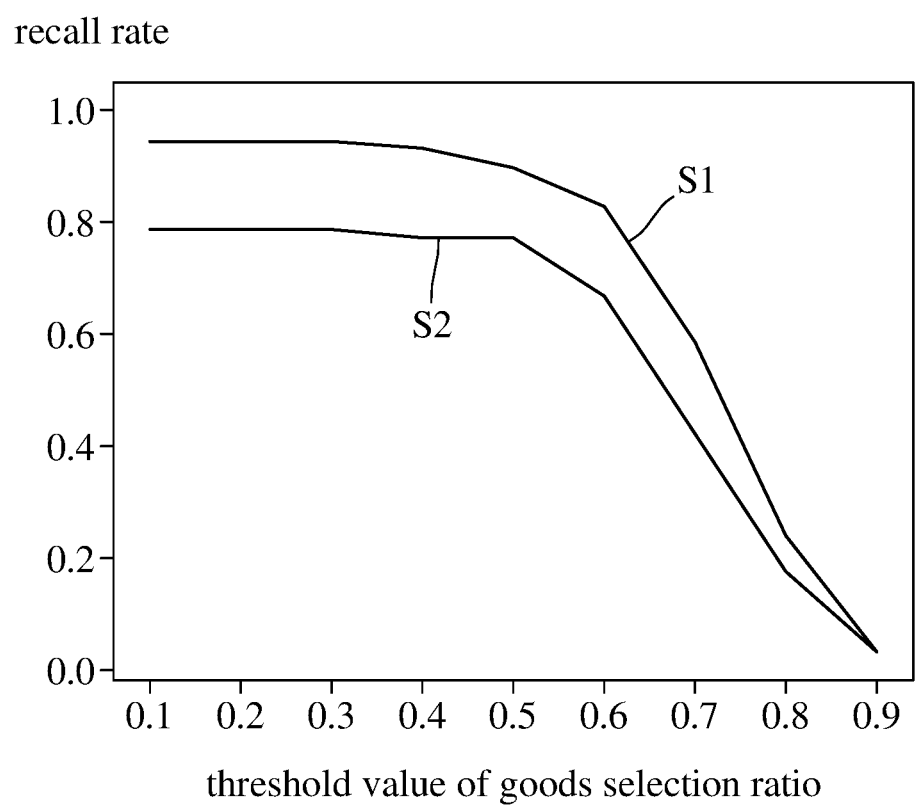
FIG. 14 is a comparison diagram of a recall rate of goods modeling based on the synthesized image and another recall rate of single goods modeling.

FIG. 14 is a comparison diagram of a recall rate of goods modeling based on synthesized images and another recall rate of single goods modeling. As shown in FIG. 14, the horizontal axis is the threshold value of the goods selection ratio. In this embodiment, the goods selection ratio is an intersection over union (IOU) of the goods and the selected goods image. When the goods selection ratio is greater than the threshold value of the goods selection ratio, it is judged that the goods has been selected. The vertical axis is the recall rate. In this embodiment, the recall rate is the ratio of the proposed selection or the ratio of the number of selections to the number of goods. The curve 51 represents a recall rate of multiple goods modeling based on the synthesized image of this disclosure. The curve S2 represents a recall rate of single goods modeling. As shown in FIG. 14, the recall rate of the curve 51 is higher than the recall rate of the curve S2.

In one embodiment of the disclosure, the synthesized image generated by the image synthesis processing is used to simulate the adjacent or partially overlapping situation of different goods on the platform, which can reduce the time required to generate the goods model. Furthermore, the goods model generated by the machine learning algorithm according to the synthesized image has a high recognition rate and can be applied to the product recognition of unmanned stores.

In view of the above description, multiple cameras shoot the goods on the platform at one time to obtain goods images with multiple different viewing angles, which can reduce time for capturing goods images with multiple different viewing angles. Furthermore, the synthesized image generated by the image synthesis processing is used to simulate the situation where a variety of different goods are adjacent to each other or partially overlapped on the platform, there is no need to manually place multiple goods on the platform in various permutations and combinations, and then the cameras shoot the platform which a plurality of goods is placed on, which may reduce time for generating modeling data. Moreover, the goods model generated by the machine learning algorithm based on the synthesized image has a high recognition rate and can be applied to the product recognition of unmanned stores.

What is claimed is:

1. A method for generating goods modeling data comprising:
   obtaining a platform image associated with a platform;
   obtaining a plurality of first goods images of a first goods placed on the platform, wherein the first goods images respectively correspond to different viewing angles;
   obtaining a plurality of second goods images of a second goods placed on the platform, wherein the second goods images respectively correspond to the different viewing angles; and
   performing an image synthesis processing on the platform image and at least one of the first goods images and the second goods images to generate a synthesized image, wherein the synthesized image comprises at least a plurality of adjacent or partially overlapping image areas which corresponds to the different viewing angles, and the image areas comprises a first image area and a second image area, the first image area comprises one of the first goods images or one of the second goods images, and the second image area comprises one of the first goods images or one of the second goods images.

2. The method in claim 1, wherein obtaining the first goods images of the first goods placed on the platform comprises:
   placing the first goods on the platform to obtain a plurality of first initial images, wherein each of the initial image comprises the first goods image and the platform image; and
   performing a background removal processing for removing the platform images of the first initial images to generate the first goods images.

3. The method in claim 2, wherein the first initial images are captured by multiple cameras at one time, and the multiple lenses of the cameras face the platform along the same direction.

4. The method in claim 2, wherein the first goods is sequentially placed on a plurality of positions of the platform, and a camera sequentially shoots the first goods which is sequentially placed on the positions of the platform to obtain the first initial images.

5. The method in claim 1, further comprising obtaining a plurality of third goods images to a plurality of N-th goods images associated with a third goods to a N-th goods placed on the platform, wherein the third goods images to the N-th goods images respectively correspond to the difference viewing angles, and N is a positive integer which is greater than or equal to three, and wherein performing the image synthesis processing on the platform image and at least one of the first goods images to the N-th goods images to generate the synthesized image comprises: overlapping at least one of the first to the N-th goods images with the platform image by placing in different column directions sequentially, placing in different row directions sequentially, placing from an upper edge of the platform image to a lower edge of the platform image, placing from the lower edge of the platform image to the upper edge of the platform image, placing from a left edge of the platform image to a right edge of the platform image, placing from the right edge of the platform image to the left edge of the platform image, placing from the upper edge of the platform image to the lower edge of the platform image in one column and then placing from the lower edge of the platform image to the upper edge of the platform image in a next column, placing from the lower edge of the platform image to the upper edge of the platform image in the one column and then placing from the upper edge of the platform image to the lower edge of the platform image in the next column, placing from the left edge of the platform image to the right edge of the platform image in one row and then placing from the right edge of the platform image to the left edge of the platform image in a next row, placing from the right edge of the platform image to the left edge of the platform image in the one row and then placing from the left edge of the platform image to the right edge of the platform image in the next row, placing in spiral shape from inside to outside, placing in spiral shape from outside to inside, or placing randomly.

6. The method in claim 1, further comprising obtaining a plurality of third goods images to a plurality of N-th goods images associated with a third goods to a N-th goods placed on the platform, wherein the third goods images to the N-th goods images respectively correspond to the difference viewing angles, and performing the image synthesis processing on the platform image and at least one of the first goods images to the N-th goods images to generate the synthesized image comprises:
   from the first goods images to the N-th goods images, selecting one goods image corresponding to a k-th position in a j-th column direction as a k-th selected image in the j-th column direction, wherein an initial value of the j is 1, an initial value of the k is 1; and overlapping the k-th selected image in the j-th column direction with the platform image, wherein the k-th selected image in the j-th column direction overlapping with the platform image has a first center point.

7. The method in claim 6, further comprising:

rotating, shifting, adjusting a brightness or adjusting an appearance rate of the k-th selected image in the j-th column direction.

8. The method in claim 6, wherein performing the image synthesis processing on the platform image and at least one of the first goods images to the N-th goods images to generate the synthesized image comprises:

from the first goods images to the N-th goods images, selecting one goods image corresponding to a k+1-th position in the j-th column direction as the k+1-th selected image in the j-th column direction;

estimating a second center point of the k+1-th selected image in the j-th column direction after overlapping the k+1-th selected image with the platform image according to widths of the k-th selected image and the k+1-th selected image in the j-th column direction; and determining whether the first center point of the k+1-th selected image in the j-th column direction is outside a range of the platform image.

9. The method in claim 8, wherein performing the image synthesis processing on the platform image and at least one of the first goods images to the N-th goods images to generate the synthesized image comprises:

overlapping the k+1-th selected image in the j-th column direction with the platform image when the second center point of the k+1-th selected image in the j-th column direction is not outside the range of the platform image.

10. The method in claim 9, wherein a difference between the second center point of the k+1-th selected image in the j-th column direction and the first center point of the k-th selected image in the j-th column direction equals to an average of widths of the k-th selected image and the k+1-th selected image in the j-th column direction.

11. The method in claim 8, wherein performing the image synthesis processing on the platform image and at least one of the first goods images to the N-th goods images to generate the synthesized image comprises:

from the first goods images to the N-th goods images, selecting one goods image corresponding to a k-th position in the j+1-th column direction as a k-th selected image in the j+1-th column when the second center point of the k+1-th selected image in the j-th column direction is outside the range of the platform image;

estimating a third center point of the k-th selected image in the j+1-th column direction after overlapping the k-th selected image in the j+1-th column direction with the platform image according to a length of the k-th selected image in the j-th column direction and a length of the k-th selected image in the j+1-th column direction; and determining whether the third center point of the k-th selected image in the j+1-th column direction is outside the range of the platform image, overlapping the k-th selected image in the j+1-th column direction with the platform image when the third center point of the k-th selected image in the j+1-th column direction is not outside the range of the platform image, generating the synthesized image according to the overlapped platform image when the third center point of the k-th selected image in the j+1-th column direction is outside the range of the platform image.

12. The method in claim 11, wherein a difference between the third center point of the k-th selected image in the j+1 column direction and the first center point of the k-th selected image in the j-th column direction equals to an average of the length of the k-th selected image in the j+1-th column direction and the length of the k-th selected image in the j-th column direction.

13. A goods modeling data generation device, comprising:
a platform for placing a first goods and a second goods;
at least one camera; and
a management host electrically connected to the at least one camera, wherein the management host is configured to drive the at least one camera to shoot the platform to obtain a platform image, to shoot the first goods to obtain a plurality of first goods images, and to shoot the second goods to obtain a plurality of second goods images, the first goods images respectively correspond to a plurality of different viewing angles, and the second goods images respectively correspond to the different viewing angles, the management host is configured to perform an image synthesis processing to generate a synthesized image according to the platform image and at least one of the first goods images and the second goods images, the synthesized image comprises at least a plurality of adjacent or partially overlapping image areas which corresponds to the different viewing angles, and the image areas comprises a first image area and a second image area, the first image area comprises one of the first goods images or one of the second goods images, and the second image area comprises one of the first goods images or one of the second goods images.

14. The goods modeling data generation device in claim 13, further comprising a rack, wherein the number of the at least one camera is one, and the camera is connected to the rack.

15. The goods modeling data generation device in claim 13, further comprising a slide mechanism, wherein the number of the at least one camera is one, and the camera is connected to the slide mechanism.

16. The goods modeling data generation device in claim 13, further comprising a plurality of racks, wherein the number of the at least one camera is multiple, the cameras are respectively fixed to the racks and face the platform along the same direction.

17. The goods modeling data generation device in claim 16, wherein the cameras are fixed to the racks according an array form.

18. The goods modeling data generation device in claim 13, wherein the first goods images and the second goods images have different brightnesses respectively.

19. The goods modeling data generation device in claim 13, wherein the platform image has a horizontal coordinate upper limit and a vertical coordinate lower limit, and a vertical coordinate of a center point of one of the first goods images or one of the second goods images which overlaps with the platform image is greater than or equal to the vertical coordinate lower limit, a horizontal coordinate of the center point of one of the first goods images or one of the second goods images which overlap with the platform image is less than or equal to horizontal coordinate upper limit.

* * * * *